United States Patent [19]

McGinniss

[11] 3,847,771

[45] Nov. 12, 1974

[54] UV AND LASER CURING OF PIGMENTED POLYMERIZABLE BINDERS

[75] Inventor: Vincent Daniel McGinniss, Middleburgh Heights, Ohio

[73] Assignee: SCM Corporation, Cleveland, Ohio

[22] Filed: Mar. 30, 1973

[21] Appl. No.: 346,351

[52] U.S. Cl....... 204/159.24, 96/115 P, 204/159.13, 204/159.14, 204/159.18, 204/159.19, 260/37 EP, 260/37 N, 260/37 SB, 260/41 A, 260/41 B, 260/41 AG, 260/827, 260/861

[51] Int. Cl........ C08d 1/00, C08d 1/16, C08f 1/20, C08f 29/00, C08f 45/02, C08f 45/66

[58] Field of Search...... 204/159.24; 96/86 P, 86 R, 96/115 P, 115 R

[56] References Cited
UNITED STATES PATENTS

| | | | |
|---|---|---|---|
| 3,427,161 | 2/1969 | Laridon et al. | 96/115 R |
| 3,615,452 | 10/1971 | Cerwonka | 204/159.24 |
| 3,637,375 | 1/1972 | Levinos | 204/159.24 |
| 3,787,212 | 1/1974 | Heimsch et al. | 204/159.24 |

*Primary Examiner*—Murray Tillman
*Assistant Examiner*—Thurman K. Page
*Attorney, Agent, or Firm*—Thomas M. Schmitz

[57] ABSTRACT

An improved process for laser or UV curing of pigmented binder systems comprising ethylenically unsaturated polymer binders containing at least about 0.05 weight parts of opacifying pigment per weight part of binder wherein the pigmented binder system includes from about 0.5% up to about 3% of 2,2'-dithiobis-(benzothiazole) synergistic sensitizer in combination with about 0.1 to 2% aromatic amine carbonyl compounds and from about 0.5% to 2% aromatic ketone or aldehyde. The sensitized binder system is a substantially improved system suitable for curing by ultraviolet or laser energy sources.

6 Claims, No Drawings

UV AND LASER CURING OF PIGMENTED POLYMERIZABLE BINDERS

BACKGROUND OF THE INVENTION

This invention pertains to an improvement in a process for curing ethylenically unsaturated vehicles used as binders for pigments and fillers in surface coatings, and particularly to curing such coatings with ultraviolet or laser radiation until the paint coating is hard and tack free.

It is well known that conventional convection ovens or infrared ovens or other heat sources may be used to heat cure or polymerize various polymeric binders used in surface paint coatings and usually the curing is promoted by a catalyst provided in the coating system. More recently, however, a broad spectrum of ultraviolet wave energy curing has been suggested for polymerizing binders wherein suitable ultraviolet sensitizers are incorporated in the coating system for initiating polymerization of the binder. The UV sources ordinarily produce wavelengths in the UV spectrum that are transmittable through a quartz and generally provide useful wavelengths between about 1,600 Angstroms and about 4,000 Angstroms. Typical UV emitters include various electric arc lamps, the plasma arc torch described in U.S. Pat. No. 3,364,387, and lasers having a lasing output in the UV spectrum range such as disclosed in U.S. Ser. No. 189,254. The subject matter of the foregoing references are incorporated herein by reference.

Although many prior art processes disclose desirable UV and laser curing of various polymers, the UV and laser curing processes are hindered by the pigments and fillers incorporated into opacifying paint systems. Pigments, filler and other inorganics very often absorb the wavelengths of the UV or laser source whereby the curing process is hindered. Accordingly, various promoters have been suggested for promoting UV and laser curing of ethylenically unsaturated polymers to promote cross-linking thereof. In U.S. Pat. No. 3,673,140, issued to Ackerman, et al., light sensitizers are disclosed for printing ink polymers wherein the preferred sensitizers are stated to be acetophenone, benzophenone, Michler's Ketone, and mixtures thereof, and said patent is incorporated herein by reference. Although such light sensitizers are satisfactory, the speed of cure is inhibited considerably by measurable amounts of pigments, fillers, tincture pigments and like inorganics which are very often incorporated into opacified paint films.

It now has been found that UV and laser curing of ethylenically unsaturated binders is substantially improved by the inclusion of a synergistic sensitizer, 2,2'-dithiobis-(benzothiazole), into an opacified paint system.

Accordingly, the primary advantages and objectives of this invention include the economical and efficient utilization of UV and laser energy to cure the thermosetting ethylenically unsaturated binders containing fillers and pigments. A further advantage is that substantially improved room temperature curing with UV and laser sources result. Other advantages include suppressing volatization of solvents; improving the color and avoiding degradation of the paint film; avoiding shrinking and distortion of the paint film; and avoiding degradation of substrates such as plastic, paper or fabric. Room temperature UV and laser curing is rapidly promoted and highly efficient even though the film is fairly thick, highly pigmented and/or heavily filled with inerts. These and other advantages of this invention will become more apparent from the detailed description of the invention.

SUMMARY OF THE INVENTION

Briefly, a photopolymerization process is provided for curing ethylenically unsaturated binders containing from about 5 to 200 weight parts of opacifying pigment per 100 weight parts of binder, wherein the pigmented binder system includes at least about 0.5% by weight of 2,2'-dithiobis-(benzothiazole) in combination with 0.1 to 2% by weight of aromatic amine carbonyl compounds and about 0.5% to 2% aromatic ketone or aldehyde sensitizer based on the pigmented-binder system to efficiently promote a UV or laser cure of the binder.

DETAILED DESCRIPTION OF THE INVENTION

The process of this invention is directed to UV or laser curing of ethylenically unsaturated binders filled with pigments, fillers, and other inorganics to provide a hard and tack-free opacified paint film. The pigmented-binder systems include a synergistic sensitizer of 2,2'-dithiobis-(benzothiazole) in combination with aromatic amine carbonyl photosensitizers and aromatic ketone or aldehyde photosensitizers. The synergistic sensitizer of this invention substantially improves a complete room temperature cure by UV or laser energy sources of an ethylenically unsaturated polymer containing inorganics.

The synergistic sensitizer of this invention is a disulfide represented by the formula:

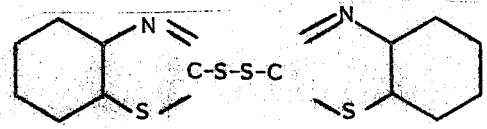

which is utilized in this invention preferably in quantities of at least from about 0.5% to about 3% by weight based on the pigmented-binder system comprising ethylenically unsaturated binder, pigments, fillers or like inert materials. The synergist sensitizer is commercially available and is a common vulconizing agent used in the rubber industry. The sensitizer is sometimes referred to as 2-benzothiazolyl.

The sensitizer 2,2'-dithiobis-(benzothiazole) becomes synergized when used in combination with aromatic carbonyl photosensitizers such phenyl carbonyl compounds and aromatic amine carbonyl compounds and sometimes referred to in the art as Michler's Ketones. Examples of aromatic amino photosensitizers include: Michler's Ketone [4,4'bis-(dimethylamino)-benzophenone]; 4,4'bis-(diethylamino)-benzophenone; p-dimethylaminobenzaldehyde; 4,4'bis-(dimethylamino)-benzil; p-dimethylaminobenzophenone; p-dimethylaminobenzoin; p-dimethylaminobenzil; N-substituted 9-acridanones; and those amino-aromatic (or phenyl) carbonyl compounds described in U.S. Pat. No. 3,661,588; and p-aminophenyl carbonyl compounds described in U.S. Pat. No. 3,552,973 and said patents are incorporated herein by reference. Aromatic carbonyl photosensitizers are preferably added to the pigmented binders in amounts of 0.1 to 2% by weight based on the pigmented-binder system.

The synergistic sensitizer of 2,2'-dithiobis-(benzothiazole) is further utilized in combination with aromatic ketone or aldehyde photosensitizers. Typical aromatic ketones and aldehydes include, for example: acetophenone; propiophenone; xanthone; benzaldehyde; benzophenone; p-chlorobenzophenone; biacetyl; benzil; fluorenone; 3-nitro-4-chlorobenzophenone 2-carbonic acid; phenanthrenequinone; benzoin and alkyl ethers of benzoin; 2-chlorothioxanthone; 10-thioxanthenone; 1-phenyl 1,2propanedione oxime and the esters or ethers thereof; isatin; anthrone; hydroxypropylbenzoate; benzoylbenzoate acrylate; 2,4dimethylbenzophenone; benzoylbiphenyl; acenaphthenequinone; dibenzosuberenone-5; and polymers and resins containing phenyl ketone or phenyl aldehydes. Aromatic ketone or aldehyde sensitizers are added to the pigmented-binder system in amounts of about 0.5% to 2% based on the pigmented-paint systems.

Aromatic carbonyl photosensitizers may be further derived from aminophenyl ketones or aldehydes contained in polymers or resins. Aromatic amino carbonyl groups may be incorporated into the polymer backbone by including at least about 5% by weight aromatic amino carbonyl group in the polymer. In synthesizing an aromatic amino carbonyl group into a polyester resin, for example, a diol of paramino benzophenone is esterified together with standard glycols and diacids. Similarly, an isocyanate reacted with diol paramino benzaldehyde or paramino benzophenone or the like may be incorporated into the urethane polymer backbone. Useful synergist producing diols may be produced, for example, by reacting active hydrogens on the amine of the amino carbonyl compounds with excess ethylene or propylene oxide to N-substituted diethanol or dipropanol compounds. Other polymers such as acrylics, epoxies, silicones may be similarly synthesized. The aromatic or aldehyde sensitizers can be similarly incorporated into the polymer backbone. The sensitizer, for example, should contain a hydroxy or carboxy functional group for reacting with conventional reactants to produce polymers containing aromatic ketone or aldehyde sensitizer group in the polymer backbone. About 2 to 10% of polymer having aromatic carbonyl compounds incorporated into the polymeric backbone is ordinarily added to the paint or binder systems whereby about 0.1 to 2.0% aromatic amine sensitizer and/or about 0.5 to 2% aromatic ketone or aldehyde sensitizer is combined with the synergistic 2,2'-dithiobis-(benzothiazole).

The polymerizable binders used for this invention are those generally known as ethylenically unsaturated binders which are curable by free-radical induced addition polymerization using peroxy or azo-catalysts for a redox system, to produce a hard, tack-free surface by addition polymerization of ethylenically unsaturated polymers of monomers. Alternatively, the binders can be fluid material wherein the ultraviolet laser causes photochemical generation of a catalytic material or effects a rearrangement which initates polymerization and that continues until a usefully cured hard surface coating film results. Examples of useful polymerizable binders are polymeric or monomeric materials, or a mixture thereof, especially those exhibiting polymerizable vinyl, acrylic, allylic, mercaptan, fumaric, maleic, or like binders having ethylenically unsaturated functionality. Reactive polymers include unsaturated polyesters, acrylics, epoxies, urethanes, silicones, amine, polyamide resins, and particularly acrylated resins such as acrylated silicone oil, acrylated polyester, acrylated urethanes, acrylated polyamides, acrylated soybean oil; acrylated epoxy resin and acrylated acrylic resin. Examples of reactive ethylenically unsaturated acrylic resin. Examples of reactive ethylenically unsaturated monomers include a variety of acrylates such as hydroxyethyl acrylate, cyclohexyl acrylate, hydroxypropyl acrylate, hydroxyethyl methacrylate, benzyl acrylate, 2-ethylhexyl acrylate, benzeol, phenyloxyethyl acrylate, lower alkoxy ethoxy acrylate, tetrahydro furfyrl acrylate, n-vinyl pyroladone vinyl acetate, styrene and substituted styrenes. Examples of ethylenically unsaturated binders include oligomers such as trimethylopropane diacrylate and triacrylate, ethylene glycol diacrylate and dimethacrylate, propoxylated bisphenol A diacrylate and dimethacrylate, and 1,6 hexane diol diacrylate pentaerythitol triacrylate.

The ethylenically unsaturated binder is combined with pigments, fillers and inerts to produce an opacified pigmented-binder system. Many useful pigments tend to absorb only minor amounts of energy in the UV range and hence pigments such as zinc oxide may be used quite favorably. Titania, such as anatase and particularly rutile, are particularly desirable in opacified paint coatings but provide opposition to a thorough cure by UV radiation. By utilizing the synergistic sensitizer of this invention, titania opacifying pigmentation may be advantageously used if desired. Other filler materials and coloring pigments include basic lead sulfate, magnesium silicate, silica, clays, wollastinite, talcs, mica, chromates, iron pigments, wood flower, microballoons, hard polymer particles and glass fiber or flake. Generally, it is desirable to use pigments which do not absorb considerable ultraviolet light in the same region of the UV spectrum as is absorbed by the synergistic sensitizer 2,2'-dithiobis-(benzothiazole).

The pigmented-binder systems may be used for paint films having film thickness of less than 1 mil and preferably about 0.1 to 0.5 mils thick.

The following examples further illustrate this invention but are not to be construed as limiting the scope of this invention. Unless otherwise stated herein all parts indicated are parts by weight and all percentages indicated are weight percentages.

EXAMPLE 1

A diacrylate (DER 332was produced by reacting two moles of acrylic acid with diglycidal ether of Bisphenol A with 0.2% benzyl dimethyl amine at 120°C. until the acid number of the reactant mixture was essentially zero.

An ethylenically unsaturated binder was produced by mixing at room temperature about 30 parts 2-ethylhexyl acrylate, about 30 parts pentaerythitol triacrylate, and about 30 parts diacrylate (DER-332). The foregoing binder was ground with rutile $TiO_2$ to produce a pigmented polymerizable binder having a pigment-binder ratio (P/B) of 0.9.

EXAMPLE 2

About 1% of 2,2'-dithiobis-(benzothiazole) and about 1% Michler's Ketone was added to the pigmented binder of Example 1. A 0.5 mil paint film drawn down on a steel panel with an 8 WW rod and was fully cured in 0.1 seconds under inert atmosphere when exposed to PARS. A similar paint film exposed within an inert atmosphere to a UV source produced a fully cured film in 7 seconds. The UV source was two 4,000 watt mercury lamps placed about 8 inches from the film. The inert atmosphere was provided by placing a polyethylene film over the film prior to curing to assimilate a nitrogen atmosphere.

EXAMPLE 3

About 2% of 2,2'-dithiobis-(benzothiazole) was added to the pigmented binder of Example 1 in combination with the addition of 1% dimethylaminobenzaldehyde plus 0.7% benzil and applied as a 0.8 mil paint film to a steel panel. The paint film was exposed in the manner of Example 2 to a PARS unit for 0.2 seconds producing a fully cured tack-free paint film, and exposure of a similar paint film to a UV source within an inert atmosphere for 7 seconds produced a fully cured tack-free film.

EXAMPLE 4

The pigmented-binder system of Example 1 was sensitized with 2% of 2,2'-dithiobis-(benzothiazole) in combination with 1.1% phenanthrenequinone and 0.3% p-dimethylaminobenzaldehyde. A 0.7 mils film was applied to a steel panel and exposed in the manner of Example 2 for 0.2 seconds to PARS resulting in a fully cured, tack-free film. A similar film was exposed 0.1 seconds to PARS which provided a fully cured, tack-free film.

EXAMPLE 5

Ethylenically unsaturated binders were synthesized in a conventional manner as follows. Siloxane-ester-acrylate resins were produced by reacting a 2 to 8 carbon diol with acrylic or methacrylic acid to give a hydroxyalkyl acrylate which was then reacted with a 4 to 10 carbon dicarboxylic anhydride and a 2 to 21 carbon atom diol. The resulting polyester was then reacted with a siloxane having 2 or more OH and/or alkoxy groups. Similarly, acrylated-amide resins were synthesized by reacting glycidyl acrylate or glycidyl methacrylate reacted with the —COOH group of an acid terminated aliphatic polyamide in a manner described in British Pat. No. 1,241,622. Acrylated-polyester resins were synthesized from a standard polyester such as propylene glycol reacted with excess molar phthalic anhydride to provide an acid terminated polyester which was thereafter reacted with glycidyl acrylate or glycidyl methacrylate. In like manner, acrylated-acrylic resins were produced by reacting a standard acrylic resin containing pendant oxirane functionality with acrylic acid to produce an ethylenically unsaturated resin wherein glycidyl methacrylate, methylmethacrylate and butyl acrylate copolymerized in solution and thereafter reacted with acrylic acid. Similarly, acrylated-urethane resins were synthesized by reacting a diol with a diisocyanate (e.g., TDI) with propylene glycol to produce an isocyanate terminated urethane resin. The —NCO terminated resin was thereafter reacted with a hydroxyl containing acrylate as hydroxyethyl acrylate to produce an acrylated urethane resin. Binder compositions synthesized in the foregoing explanatory manner were ground with $TiO_2$ pigment, sensitized with the sensitizer combinations, as indicated in Table I below, and drawn down on a steel panel in a 0.7 mil film and exposed to a PARS unit in the manner indicated in Example 2. The results for the identified compositions are set forth in the following Table I below.

TABLE 1

| No. | Binder Composition | | Photosensitizer Combination | Exposure Time To PARS | Result |
|---|---|---|---|---|---|
| a | ⅓ hydroxyethyl acrylate, ⅓ ethylene glycol diacrylate, ⅓ hydroxyethyl acrylate, having a toluene diisocyanate adduct. The pigment-binder ratio (P/B) with $TiO_2$ ground therein was 0.8 | 3.0% 2.0% | 4,4' bis (dimethylamino) benzil; benzil | 0.10 seconds | Undercured film |
| b | ⅓ hydroxyethyl acrylate, ⅓ ethylene glycol diacrylate ⅓ hydroxyethyl acrylate, having a toluene diisocyanate adduct. The P/B with $TiO_2$ was 0.8 | 3.0% 2.0% 1.5% | 4,4' bis (dimethylamino) benzil; benzil; 2,2'-dithiobis-(benzothiazole) | 0.10 seconds | Fully cured film |
| c | ⅓ 2-ethylhexyl acrylate ⅓ propylene glycol diacrylate, ⅓ polyester capped with glycidyl acrylate (molecular weight 3,000) ground with $TiO_2$ to make a P/B of 1.0 | 0.3% 1.0% | Michler's Ketone; 2-naphthyl phenyl ketone | 0.07 seconds | Slightly undercured film |
| d | ⅓ 2-ethylhexyl acrylate, ⅓ propylene glycol diacrylate, ⅓ polyester capped with glycidyl acrylate (molecular weight 3,000) ground with $TiO_2$ to make a P/B of 1.0 | 0.3% 1.0% 2.0% | Michler's Ketone; 2-naphthyl phenyl ketone; 2,2'-dithiobis-(benzothiazole) | 0.07 seconds | Fully cured film |
| e | ⅓ 2-phenoxyethyl acrylate, ⅓ pentaerythitol triacrylate, ⅓ acrylated silicone resin, ground with $TiO_2$ to make a P/B ratio of 1.0 | 0.3% 1.0% | Michler's Ketone; benzaldehyde | 0.10 seconds | Slightly undercured film |
| f | ⅓ 2-phenoxyethyl acrylate, ⅓ pentaerythitol triacrylate, ⅓ acrylated silicone resin, ground with $TiO_2$ to make a P/B ratio of 1.0 | 0.3% 1.0% 1.0% | Michler's Ketone; benzaldehyde; 2,2'-dithiobis-(benzothiazole) | 0.07 seconds | Fully cured film |
| g | ⅓ cyclohexyl acrylate, ⅓ 1,6 hexanediol diacrylate, ⅓ acrylated soybean oil, ground with $TiO_2$ to make a P/B ratio of 0.9 | 0.3% 1.0% | Michler's Ketone; acenaphthenequinine | 0.10 seconds | Slightly undercured film |

TABLE 1 —Continued

| No. | Binder Composition | | Photosensitizer Combination | Exposure Time To PARS | Result |
|---|---|---|---|---|---|
| h | ⅓ cyclohexyl acrylate,<br>⅓ 1,6 hexanediol diacrylate,<br>⅓ acrylated soybean oil, ground with TiO₂ to make a P/B ratio of 0.9 | 0.3%<br>1.0%<br>1.0% | Michler's Ketone;<br>acenaphthenequinine;<br>of 2,2'-dithiobis-(benzothiazole) | 0.07 seconds | Fully cured film |
| i | ⅓ hydroxypropyl methacrylate,<br>⅓ ethylene glycol dimethacrylate,<br>⅓ methacrylated polyamide resin, ground with TiO₂ to make a P/B ratio of 0.8 | 0.5%<br>2.0% | p-dimethylaminobenzophenone;<br>benzil | 0.10 seconds | Slightly undercured film |
| j | ⅓ hydroxypropyl methacrylate,<br>⅓ ethylene glycol dimethacrylate,<br>⅓ methacrylated polyamide resin, ground with TiO₂ to make a P/B ratio of 0.8 | 0.5%<br>2.0%<br>2.0% | p-dimethylaminobenzophenone;<br>benzil;<br>2,2'-dithiobis-(benzothiazole) | 0.10 seconds | Fully cured film |
| k | ⅓ benzil acrylate,<br>⅓ acrylated resin composition,<br>⅓ trimethylol propane triacrylate, ground with TiO₂ to make a P/B ratio of 1.0 | 0.3%<br>1.0% | Michler's Ketone;<br>xanthone | 0.07 seconds | Slightly undercured film |
| l | ⅓ benzil acrylate,<br>⅓ acrylated resin composition,<br>⅓ trimethylol propane triacrylate, ground with TiO₂ to make a P/B ratio of 1.0 | 0.3%<br>1.0%<br>1.0% | Michler's Ketone<br>xanthone;<br>2,2'-dithiobis-(benzothiazole) | 0.07 seconds | Fully cured film |

The foregoing examples are for illustration only and are not intended to be limiting. Variations and modifications are contemplated within the scope of this invention, as defined in the appended claims.

What is claimed is:

1. In a photopolymerization process for ultraviolet curing of a film applied to a substrate, the film comprising a pigmented binder system of 1 weight part of an ethylenically unsaturated binder combined with about 0.05 to 2 weight parts of opacifying pigment, and exposing said film to an energy source containing UV energy having wavelengths between about 1,600 A and 4,000 A until said film is cured, the improvement which comprises:

providng an opacified film of said pigmented binder system containing by weight about 0.5% to 3% of 2,2'-dithiobis-(benzothiazole), 0.1% to 2% of an aromatic carbonyl compound selected from the group consisting of aromatic amino ketone and aromatic phenyl ketone, and at least 0.5% of an aromatic photosensitizer selected from the group consisting of aromatic aldehydes and aromatic ketones different than said aromatic carbonyl compounds.

2. The process set forth in claim 1 wherein the aromatic carbonyl compound is an aromatic phenyl compound.

3. An ultraviolet, photopolymerizable pigmented binder system for use an an opacified film, comprising:

a pigmented binder system comprising opacifying pigment and ethylenically unsaturated binder wherein said pigmented binder system contains about 0.05 to 2 weight parts of opacifying pigment per 1 weight part of said ethylenically unsaturated binder;

said binder system containing by weight about 0.5% to 3% of 2,2'-dithiobis-(benzothiazole), 0.1% to 2% of an aromatic carbonyl compound selected from the group consisting of aromatic amino ketone and aromatic phenyl ketone, and at least 0.5% of an aromatic photosensitizer selected from the group consisting of aromatic aldehydes and aromatic ketones different from said aromatic carbonyl compounds.

4. The pigmented binder system in claim 3 wherein the aromatic carbonyl compound is an aromatic phenyl ketone.

5. In a photopolymerization process for ultraviolet curing of a film applied to a substrate, the film comprising a pigmented binder system of 1 weight part of an ethylenically unsaturated binder combined with about 0.05 to 2 weight parts of opacifying pigment, and exposing said film to an energy source containing UV energy having wavelengths between about 1,600 A and 4,000 A until said film is cured, the improvement which comprises:

providing an opacified film of said pigmented binder system containing by weight about 0.5% to 3% of 2,2'-dithiobis-(benzothiazole), 0.1% to 2% of an aromatic carbonyl compound comprising an aromatic amino ketone, and at least 0.5% of an aromatic photosensitizer selected from the group consisting of aromatic aldehydes and aromatic ketones different than said aromatic carbonyl compounds.

6. An ultraviolet, photopolymerizable pigmented binder system for use as an opacified film, comprising:

a pigmented binder system comprising opacifying pigment and ethylenically unsaturated binder where in said pigmented binder system contains about 0.05 to 2 weight parts of opacifying pigment per 1 weight part of said ethylenically unsaturated binder;

said binder system containing by weight about 0.5% to 3% of 2,2'-dithiobis-(benzothiazole), 0.1% to 2% of an aromatic carbonyl compound comprising an aromatic amino ketone, and at least 0.5% of an aromatic photosensitizer selected from the group consisting of aromatic aldehydes and aromatic ketones different from said aromatic carbonyl compounds.

* * * * *